United States Patent
Nemoto et al.

(10) Patent No.: US 8,592,348 B2
(45) Date of Patent: Nov. 26, 2013

(54) BIOMOLECULE ASSAY CHIP

(75) Inventors: Naoto Nemoto, Saitama (JP); Takanori Ichiki, Tokyo (JP); Manish Biyani, Saitama (JP)

(73) Assignee: Japan Science and Technology Agency, Kawaguchi-Shi (JP)

( * ) Notice: Subject to any disclaimer, the term of this patent is extended or adjusted under 35 U.S.C. 154(b) by 1063 days.

(21) Appl. No.: 12/447,803

(22) PCT Filed: Nov. 1, 2007

(86) PCT No.: PCT/JP2007/001197
§ 371 (c)(1),
(2), (4) Date: Jun. 10, 2009

(87) PCT Pub. No.: WO2008/053598
PCT Pub. Date: May 8, 2008

(65) Prior Publication Data
US 2010/0035769 A1    Feb. 11, 2010

(30) Foreign Application Priority Data
Nov. 1, 2006   (JP) ................................ 2006-297267

(51) Int. Cl.
C40B 50/14     (2006.01)
(52) U.S. Cl.
USPC ........................................................ 506/26
(58) Field of Classification Search
None
See application file for complete search history.

(56) References Cited

U.S. PATENT DOCUMENTS

2003/0235520 A1* 12/2003 Shea et al. .................... 422/102

FOREIGN PATENT DOCUMENTS

WO     2006041194     4/2006

OTHER PUBLICATIONS

Jung et al. (Apr. 16, 2004) Science vol. 304 pp. 428 to 431.*
Jung et al. (Apr. 16, 2004) Science vol. 304 pp. 428 to 431 supporting online material.*
Biyani et al. (Oct. 24, 2006) Nucleic Acid Research vol. 34 article e140 pp. 1 to 9.*
Biyani et al. (Oct. 24, 2006) Nucleic Acid Research vol. 34 article e140 pp. 1 to 9 Supplementary Figure S1.*
Biyani et al. (Oct. 24, 2006) Nucleic Acid Research vol. 34 article e140 pp. 1 to 9 Supplementary Figure S1 S2.*
Ramachandran et al. (Jul. 2, 2004) Science vol. 305 pp. 86 to 90.*
Rungpragayphan et al. (2002) Journal of Molecular Biology vol. 318 pp. 395 to 405.*
Pastinen et al. (1997) Genome Research vol. 7 pp. 606 to 614.*
Stearns-Kurosawa et al. (1996) PNAS USA vol. 93 pp. 10212 to 10216.*
Weng et al., Proteomics. 2: 48-57, 2002.

* cited by examiner

*Primary Examiner* — Christian Boesen
(74) *Attorney, Agent, or Firm* — Pearne & Gordon LLP (57) ABSTRACT

A method for producing a chip on which biomolecules are immobilized in an aligned state, comprises (a) producing a substrate 1 on which a plurality of biomolecules 1 of a single type are immobilized in an aligned state, (b) adding reaction reagents for synthesizing biomolecules 2 to microreactors on a microreactor chip comprising the microreactors at positions overlapping with the sequence positions of the biomolecules 1 immobilized on the substrate 1 produced in step (a), (c) closely attaching the microreactor chip to the substrate 1 so that the reaction reagents for synthesizing the biomolecules 2 are allowed to come into contact with the biomolecules 1, so as to synthesize the biomolecules 2 in the microreactors, and (d) superposing the microreactor chip on a substrate 2 after completion of step (c) so as to bind the biomolecules 2 onto the substrate 2; and a chip produced thereby.

10 Claims, 4 Drawing Sheets

(*PCR was performed for 30 cycles)

(6.7μg) (11.9μg)   Transcribed product

Figure 6

BIOMOLECULE ASSAY CHIP

TECHNICAL FIELD

The present invention relates to a chip on which biomolecules are immobilized in an aligned state.

BACKGROUND ART

A DNA chip, a protein chip, and the like are currently used as useful tools for comprehensively analyzing biomolecules. In the case of these chips, DNAs or proteins are immobilized on a substrate in an array form, and they are then subjected to an appropriate reaction system that depends on purposes, so as to comprehensively identify molecules that are likely to exhibit functions of interest.

With regard to such DNA chip, at present, the method of Affymetrix, Inc., which comprises synthesizing DNA on a chip using an optical lithography technique and then matching location information and sequence information, and the method of Stanford University, which comprises attaching DNA whose sequence has been known to a chip, are widely used. In order to examine a large number of sequences at once, the Affymetrix method is advantageous. In order to examine a limited number of DNAs whose sequences have been known, the Stanford method is convenient. Thus, the two types of methods are used, depending on purposes.

On the other hand, with regard to production of a protein chip, Phylos, Inc. has attempted to hybridize the mRNA region of IVV (in vitro virus) with an Affymetrix-type DNA substrate, so as to assign numbers to proteins on a chip and to non-covalently immobilize them thereon (Non-Patent Document 1). However, a majority of protein chips are produced by the Stanford method of producing such protein chips by spotting a limited number of specific proteins. Hence, under the present circumstances, it is extremely difficult to produce protein chips from an enormous library comprising genes having unknown sequences. In this respect, the method of Phylos, Inc. is most advantageous. However, since hybridization is used in immobilization of proteins in the method of Phylos, Inc., this method is not considered as a stable immobilization method, when an enzyme assay is carried out under various buffer conditions. Thus, this method has not yet been practically used. In addition, since this method comprises a process of introducing a region to be hybridized as a tag, it is not necessarily said that it is efficient from the viewpoint of practical utility.

The present inventors have provided various techniques for identification and development of useful proteins using the IVV (in vitro virus) method (Patent Document 1). The IVV method has attracted attention as a method of selecting a peptide molecule of interest from large quantities of peptides having random sequences or a peptide library comprising such peptides, which is advantageous in terms of evolutionary engineering. The IVV method is capable of matching nucleic acid sequence information and the activity or function of the corresponding protein on a one-to-one basis. Thus, if this method could be used in a comprehensive analysis, proteins with desired activity and information regarding nucleic acid sequences encoding the same can be obtained simultaneously in a large volume. However, at the present stage, techniques of applying such method to comprehensive analyses have not yet been reported.

[Non-Patent Document 1] Weng et al., Proteomics. 2: 48-57, 2002

[Patent Document 1] International Publication WO2006/041194

DISCLOSURE OF THE INVENTION

Problems to be Solved by the Invention

Under the aforementioned circumstances, the present inventors have conducted intensive studies directed towards developing a method of individually immobilizing each mutant proteins on a chip from a DNA library comprising an enormous number of mutants, without a step of cloning them. As a result, the inventors have discovered that an mRNA chip and a protein chip that correspond to a DNA chip in which desired DNAs are aligned in an array form can be produced in a series of steps, by using a μTAS technique, thereby completing the present invention.

Thus, it is an object of the present invention to provide a method for producing a biomolecule assay chip using a microreactor chip, and a chip produced by the aforementioned method.

Moreover, it is another object of the present invention to provide a method for synthesizing another biomolecule from a biomolecule immobilized on the aforementioned chip without changing the position of the biomolecule immobilized, and a chip produced by the aforementioned method.

Means for Solving the Problems

Specifically, the present invention relates to the following (1) to (15):

(1) A first aspect of the present invention relates to "a method for producing a chip on which biomolecules are immobilized in an aligned state, which comprises the following steps (a) to (d):

(a) a step of producing a substrate 1 on which a plurality of biomolecules 1 of a single type are immobilized in an aligned state;

(b) a step of filling microreactors on a microreactor chip comprising the microreactors at positions overlapping with the sequence positions of the biomolecules 1 immobilized on the substrate 1 produced in the step (a), with reaction reagents for synthesizing biomolecules 2;

(c) a step of closely attaching the microreactor chip to the substrate 1 so that the reaction reagents for synthesizing the biomolecules 2 are allowed to come into contact with the biomolecules 1, and then carrying out a reaction of synthesizing the biomolecules 2 in the microreactors so as to synthesize the biomolecules 2; and (d) superposing the microreactor chip on a substrate 2 so that the reaction solutions contained in the microreactors on the microreactor chip are allowed to come into contact with the substrate 2 after completion of the step (c), so as to immobilize the biomolecules 2 on the substrate 2."

(2) A second aspect of the present invention relates to "the method according to claim 1, wherein the step of producing 'a substrate 1 on which a plurality of biomolecules 1 of a single type are immobilized in an aligned state' described in the step (a) according to (1) above further comprises the following steps (a) to (c):

(a) a step of diluting mixed solutions of the biomolecules 1 and reaction reagents for amplifying the biomolecules, and then filling the microreactors on the microreactor chip with the diluted solutions, so that a single molecule or less of the biomolecules 1 can be present therein in a probability distribution manner;

(b) a step of carrying out a reaction of amplifying the biomolecules 1; and (c) a step of superposing the microreactor chip on the substrate 1 so that the reaction solutions contained in the microreactors on the microreactor chip are allowed to come into contact with the substrate 1, so as to immobilize the amplified biomolecules 1 on the substrate."

(3) A third aspect of the present invention relates to "the method according to (2) above, wherein the biomolecules 1 are nucleic acids or nucleic acid derivatives.

(4) A fourth aspect of the present invention relates to "the method according to (3) above, wherein the reaction of amplifying the biomolecules 1 is a polymerase chain reaction."

(5) A fifth aspect of the present invention relates to "the method according to (3) or (4) above, wherein the nucleic acid derivatives are those to which linker DNA ligates."

(6) A sixth aspect of the present invention relates to "the method according to (5) above, wherein puromycin binds to the linker DNA."

(7) A seventh aspect of the present invention relates to "the method according to any one of (3) to (6) above, wherein it comprises immobilizing avidin on the substrate 1 and thereby biotinylating the nucleic acids or nucleic acid derivatives."

(8) An eighth aspect of the present invention relates to "the method according to any one of (1) to (7) above, wherein the biomolecule 1 is DNA and the biomolecule 2 is RNA."

(9) A ninth aspect of the present invention relates to "the method according to (8) above, wherein the RNA is mRNA."

(10) A tenth aspect of the present invention relates to "the method according to any one of (1) to (9) above, wherein the puromycin-binding linker DNA is immobilized on the substrate 2."

(11) An eleventh aspect of the present invention relates to "a chip produced by the method according to any one of (1) to (10) above."

(12) A twelfth aspect of the present invention relates to "a method for producing a chip on which biomolecules 3 are immobilized in an aligned state, which comprises immersing the chip according to (11) above in one or more types of reaction solutions for synthesizing biomolecules 3 from the biomolecules 2 immobilized on the chip according to (11) above."

(13) A thirteenth aspect of the present invention relates to "the method according to (12) above, wherein the biomolecule 2 is mRNA, the reaction solution is a solution containing a cell-free translation system, and the biomolecules 3 is a protein-nucleic acid complex."

(14) A fourteenth aspect of the present invention relates to "the method according to (12) above, wherein the biomolecule 2 is mRNA, the reaction solutions are a solution containing a cell-free translation system and a solution containing reverse transcriptase, and the biomolecules 3 is a protein-DNA complex."

(15) A fifteenth aspect of the present invention relates to "a chip produced by the method according to any one of (11) to (14) above."

Effects of the Invention

According to the present invention, chips on which DNAs, RNAs, and proteins are immobilized to the corresponding positions can be produced. Thus, it becomes possible to monitor the results by matching nucleic acid sequence information on the DNA and the function of the protein on a one-to-one basis.

Using the method and chip of the present invention, a molecule (DNA or a protein) which has been modified to achieve desired functions can be identified in a relatively short time.

Using the method and chip of the present invention, gene functions (particularly associated with enzyme) obtained by genome analysis or the like can be identified in a relatively short time.

Using the method and chip of the present invention, several gene combinations are produced in order to analyze a metabolic pathway, and they are then assayed, so as to rapidly identify a pathway from a substrate to a metabolite.

When the method and chip of the present invention are used, an excellent inhibitor candidate can be selected by adding a single type of enzyme to each well, also adding a substrate and an inhibitor candidate thereto, and observing a change in the concentration of the substrate due to the addition of the substrate and the inhibitor candidate.

BEST MODE FOR CARRYING OUT THE INVENTION

The present invention provides: a method for producing a chip, which comprises repeating a step of superposing a microreactor chip comprising microreactors on a substrate to synthesize other biomolecules from biomolecules immobilized in an aligned state without changing the positions of the biomolecules immobilized, and finally producing a chip on which biomolecules different from the initially immobilized biomolecules are immobilized; and a chip produced by the aforementioned method. More specifically, there is provided, for example, a method for producing a chip on which proteins are immobilized from a chip on which DNAs are immobilized, via consecutive steps, without changing the corresponding positions of DNAs-proteins on the chips.

According to the present invention, from a DNA chip on which DNAs of a single type from various types of DNAs selected from a DNA library or the like are immobilized in an aligned state, a protein chip on which proteins encoded by the individual DNAs are immobilized in positions corresponding to the positions of the DNAs immobilized can be produced.

Moreover, if the proteins immobilized on the aforementioned protein chip are immobilized as complexes with mRNAs, it is possible to carry out a reverse transcription reaction on the protein chip, and thereby to produce a chip on which DNAs encoding the proteins are immobilized. Herein, with regard to mRNA, a DNA chip is superposed on a microreactor chip, and a transcription reaction is carried out in each microreactor, so that the corresponding mRNA can be obtained in the microreactor.

A complex of mRNA and a protein can be produced, for example, via linker DNA to which a compound specifically binding to a protein, such as puromycin, binds. That is, if linker DNA having a sequence complementary to the 3'-terminus of mRNA, to which puromycin binds, is used, the linker binds to the mRNA via a complementary portion. Thus, in the generated complex, puromycin binds to the mRNA via the linker DNA. It is to be noted that the binding of linker DNA to puromycin can be carried out according to a known method.

Furthermore, using a microreactor chip comprising microreactors corresponding to the positions of proteins immobilized on the chip, the activity and the like of all the proteins immobilized on the chip can be measured, after production of the chip. For example, a microreactor chip in which reaction solutions for measuring the activity of proteins immobilized on the chip are added to individual microreactors is superposed on a substrate, so that the positions of the microreactors correspond to the positions of the proteins immobilized, and so that each protein is allowed to sufficiently come into contact with the reaction solution in each microreactor. Thereafter, an activity-measuring reaction is carried out. Thus, it becomes possible to simultaneously analyze the activity of all the proteins immobilized on the chip.

The present method is useful for selection of a mutant having the excellent activity of a protein of interest, etc. For instance, when a chip on which a DNA library in which mutations have been systematically introduced into specific proteins is immobilized is used as an initial DNA chip, production of a protein chip corresponding to the DNA chip, the measurement of the activity of proteins on the protein chip, and evaluation of such activity can be carried out as a single step. If a desired protein can be identified based on the evaluation results, DNA encoding the protein can be easily obtained by reverse transcription of mRNA. Thus, the primary sequence information of the protein can also be easily obtained. Based on the obtained primary sequence information, other proteins can be further searched.

The main embodiments of the present invention will be described below.

An embodiment of the present invention relates to a method for producing a chip on which biomolecules are immobilized in an aligned state, which comprises the following steps (a) to (d):
(a) a step of producing a substrate 1 on which a plurality of biomolecules 1 of a single type are immobilized in an aligned state;
(b) a step of filling microreactors on a microreactor chip comprising the microreactors at positions overlapping with the sequence positions of the biomolecules 1 immobilized on the substrate 1 produced in the step (a), with reaction reagents for synthesizing biomolecules 2;
(c) a step of closely attaching the microreactor chip to the substrate 1 so that the reaction reagents for synthesizing the biomolecules 2 are allowed to come into contact with the biomolecules 1, and then carrying out a reaction of synthesizing the biomolecules 2 in the microreactors so as to synthesize the biomolecules 2; and
(d) superposing the microreactor chip on a substrate 2 so that the reaction solutions contained in the microreactors on the microreactor chip are allowed to come into contact with the substrate 2 after completion of the step (c), so as to immobilize the biomolecules 2 on the substrate 2.

Herein, the "biomolecule 1" can preferably be converted to another biomolecule in vitro. For example, DNA, RNA, and the like can be used. The "biomolecule 1" should be immobilized on a substrate in an aligned state. When the biomolecule 1 is DNA, for example, a method using an avidin-biotin bond, a method of modifying DNA with a functional group such as an amino group, an aldehyde group or an SH group, and then subjecting a chip to a surface treatment with a silane coupling agent having an amino group, an aldehyde group, an epoxy group or the like, and other methods can be used for immobilization of the biomolecule. Of these, a method using an avidin-biotin bond is particularly preferable. In this case, it is preferable that avidin be immobilized on a substrate and that biotin bind to DNA. On the other hand, when the biomolecule 1 is RNA, for example, a method of binding the RNA to a substrate via an avidin-biotin bond and then immobilizing it thereon via a DNA linker complementary to a portion of the RNA, a method of modifying RNA with a functional group such as an amino group, an aldehyde group or an SH group, and then subjecting a chip to a surface treatment with a silane coupling agent having an amino group, an aldehyde group, an epoxy group or the like, and other methods can be used. In the case of RNA also, as stated above, a method of immobilizing avidin on a substrate and then binding biotin to linker DNA is preferable.

The term "microreactor chip" is used herein to mean an ultrafine reacting device produced by forming fine flow passages or fine hollows on a substrate such as a polymer, glass or silicon, in which a chemical reaction can be carried out in the flow passages or hollows (microreactors). In order to suppress adsorption of biomolecules, the surface of the microreactor chip is preferably modified with PEG and the like.

In the present embodiment, it is necessary to allow the biomolecule immobilized on a substrate to come into contact with a reaction reagent in each microreactor, so that they can be reacted with each other. Herein, the surfaces of substrate 1 and substrate 2 are not necessarily flat. For example, in order to increase the surface area on which biomolecules are immobilized, asperity may be formed thereon. However, when the substrate is superposed on the microreactor chip, in order to prevent the leakage of reagents and the like from all the microreactors on the microreactor chip, the surface of a portion of the substrate, with which the microreactor chip is allowed to come into contact, should be flat.

Moreover, in order to carry out the aforementioned reaction under optimal conditions, other apparatuses for controlling the temperature of the microreactor, a pH condition in the microreactor, etc. may be combined with the microreactor chip. When the biomolecule 1 is DNA and the biomolecule 2 is RNA, for example, the term "reaction reagent" is used herein to mean a reagent necessary for transcription. As such reaction reagent, either a commercially available reaction reagent or an originally prepared reaction reagent may be used.

The substrate 1 used in the step (a) of the present embodiment can also be produced by the following method. When the biomolecule 1 is DNA, a mixture of several types of DNAs (e.g. a DNA library, etc.) is first mixed with a DNA amplification reagent. The obtained mixture is diluted with a suitable buffer, and it is then dispensed into microreactors. Herein, the mixture is diluted with the buffer, and the thus diluted solution is then dispensed in each microreactor, so that a single molecule of DNA can be contained in each microreactor. The timing of dilution of the DNA and the amplification reagent is not particularly limited. After completion of the pouring, the conditions of the microreactor chip are determined, so that the conditions are suitable for amplification of the DNA. Thereafter, the reaction is carried out. As a result, DNAs of different types can be amplified in individual microreactors. Subsequently, the microreactor chip comprising the amplified DNAs is closely attached to the substrate 1, so that the chip is allowed to come into contact with the substrate, and the DNA molecule in the microreactor is thereby immobilized on the substrate 1. When DNA is amplified, a PCR reaction is preferably used. For the PCR reaction, commercially available products such as a reaction solution necessary for the reaction can be used. Moreover, when the DNA in the microreactor is immobilized on the substrate, an amplification reaction is performed so that biotin is incorporated into the DNA, whereas the substrate is coated with avidin. Thus, the DNA can be easily immobilized on the substrate via an avidin-biotin bond. As a method of incorporating biotin into DNA, a method using PCR primers labeled with biotin and the like can be applied.

Furthermore, when the biomolecule 1 or 2 is a nucleic acid, DNA serving as a linker may be ligated to the nucleic acid, and puromycin may be bound to the terminus thereof.

In the present embodiment, the biomolecules 2 synthesized in the microreactors are immobilized on another substrate (substrate 2), so as to produce a chip on which the biomolecules 2 are immobilized in an aligned state. Herein, as a method of immobilizing the biomolecules 2 on a substrate, when the biomolecule 2 is RNA, a linker having a sequence complementary to a portion of the RNA, for example, has previously been immobilized on the substrate, so that the RNA in the microreactor can be easily immobilized on the substrate. The linker used herein preferably has a sequence complementary to sequences shared by all different types of RNAs existing in different microreactors. As the "sequences shared by all different types of RNAs," the sequences of PCR primers used in amplification of DNA (biomolecule 1) used as a template of RNA and the like may be used. Further, puromycin may also bind to the terminus of a linker. It is desired to establish a hydrophilic flexible structure such as polyethylene glycol (PEG) between such linker DNA and puromycin. Moreover, it is preferable to establish a sequence portion consisting of one or more nucleotides that does not hybridize with mRNA, so that it can be easily ligated via T4 RNA ligase after completion of the hybridization with the mRNA.

Another embodiment of the present invention relates to: a method for synthesizing biomolecules 3 from the biomolecules 2 immobilized on a chip produced in the aforementioned embodiment by allowing the produced chip to come into contact with various types of reaction solutions; and a chip produced by the aforementioned method. When the biomolecule 2 is mRNA, a solution containing a cell-free translation system is allowed to come into contact with a chip on which the mRNA is immobilized, so as to react them using the mRNA as a template to synthesize a protein (biomolecule 3). In this case, if a puromycin-binding linker is used in the aforementioned first embodiment, the synthesized protein binds to the linker via the puromycin, and thus a chip on which the biomolecules 3 are immobilized can be produced. The cell-free translation systems that can be used herein include *Escherichia coli*, rabbit reticulocyte, and wheat germ-derived cell-free system. Commercially available products may also be used. The thus synthesized biomolecule 3 is a complex with mRNA, linker DNA, and a protein. Further, a complex of the biomolecule 3 with DNA, linker DNA, and a protein, corresponding to the biomolecule 1, can also be produced by performing a reverse transcription reaction from mRNA to DNA in a reaction solution that contains reverse transcriptase.

By measuring the activity or the like of the biomolecule 3 (a protein) immobilized on the chip produced in the aforementioned other embodiment, a protein retaining desired activity can be easily identified on the chip. Furthermore, by determining the sequence of DNA (biomolecule 1) corresponding to the identified protein, the sequence information of the DNA corresponding to the protein having desired activity can be easily obtained. Herein, when the activity of a protein is measured, there is prepared a microreactor chip comprising microreactors corresponding to the positions of the proteins (namely, biomolecules 3) immobilized on the chip produced in the aforementioned other embodiment. Thereafter, each microreactor on the microreactor chip has previously been filled with a solution necessary for the measurement of the protein activity, and the aforementioned chip is superposed on the microreactor chip for the reaction, thereby measuring the activity of the protein immobilized on the chip.

Examples will be given below. However, these examples are not intended to limit the scope of the present invention.

EXAMPLES

Figure 1:
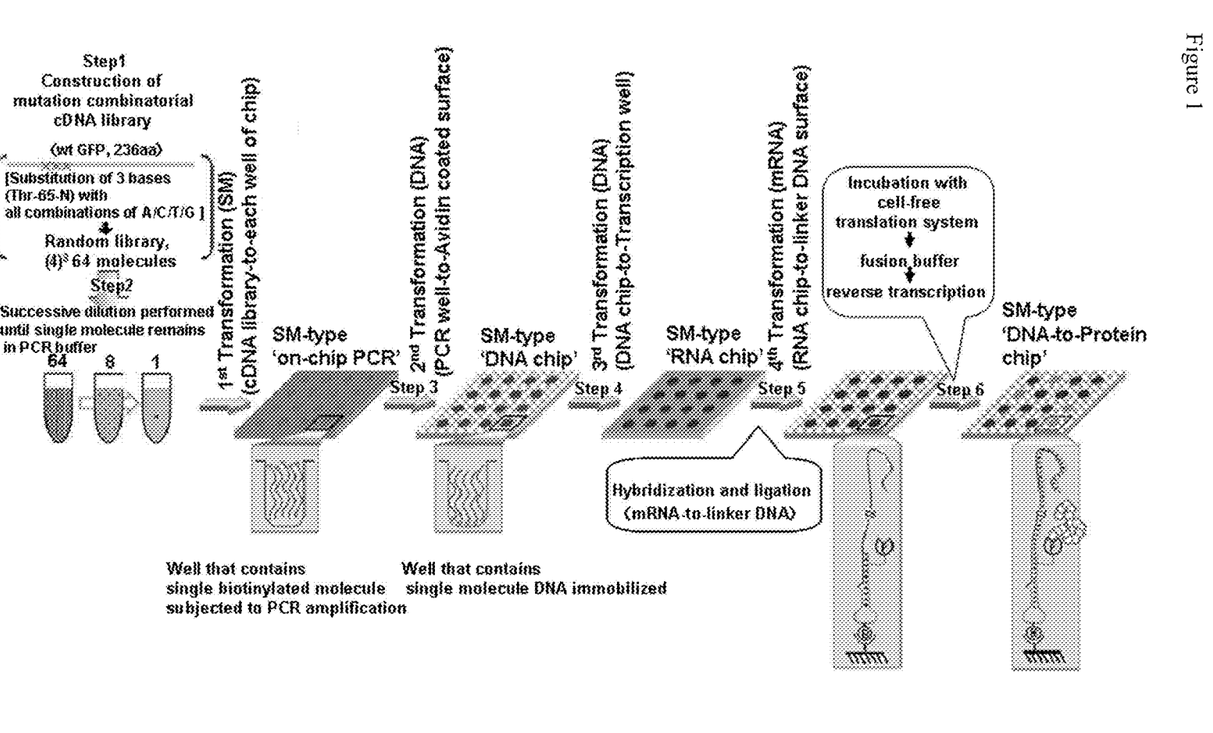
FIG. 1 is a schematic view showing a process of producing the chip of the present invention.
Figure 2:
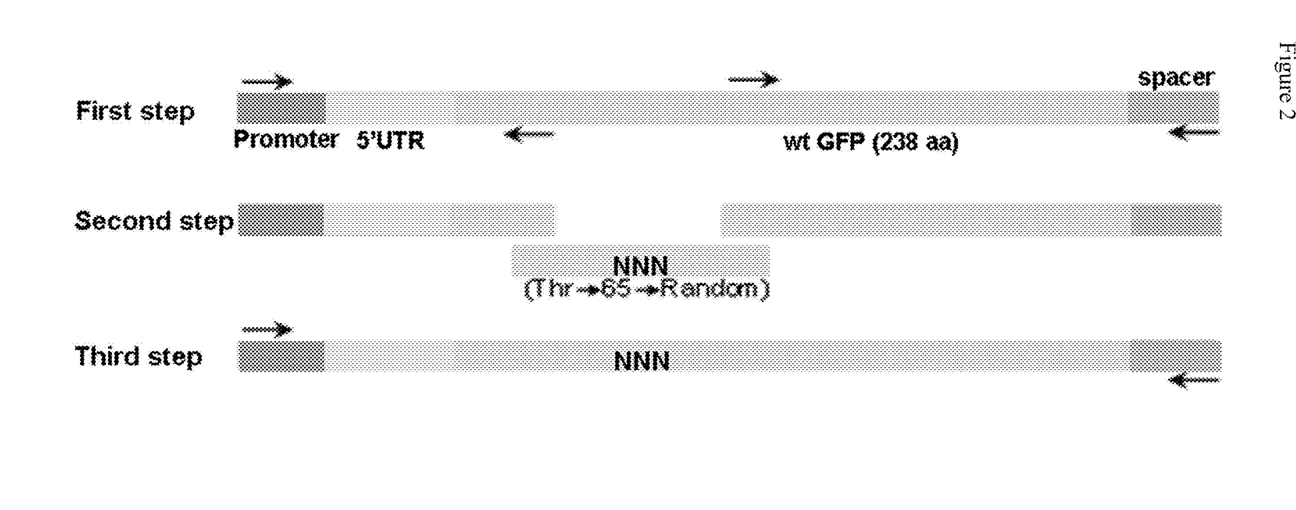
FIG. 2 is a view schematically showing a step of constructing a GFP mutant library.

A method for producing a protein chip from DNA is as follows (FIG. 1).
Step 1: Construction of a library (cDNA)
Step 2: Dilution of a library to result in a concentration of a single molecule on a chip and single-molecule PCR
Step 3: Immobilization of a PCR product on the chip
Step 4: Transcription on the chip
Step 5: Transfer of a transcription product to another chip and a reaction of ligating it to linker DNA on the surface thereof.
Step 6: Addition of cell-free translation system to the chip of step 5, and immobilization of DNA and a protein on the chip by a reaction of ligating RNA to the protein and a reverse transcription reaction
1. Construction of Library GFP (Green Fluorescent Protein) was selected as a model protein, and random mutation was introduced into the threonine at position 65 that is important for fluorescence activity so as to create a library. In this library, a DNA construct having a T7 promoter and 5' UTR (TMV omega) at the 5'-terminal side and a spacer at the 3'-terminal side was constructed by the method as shown in FIG. 2. The following primer 1 and primer 2 were used to amplify a DNA fragment comprising the T7 promoter and 5'UTR region of the first step. In addition, the following primer 3 and primer 4 were used to perform PCR on a region containing GFP.

```
(Primer 1)
                                        (SEQ ID NO: 1)
5'-GATCCCGCGAAATTAATACGACTCACTATAGGG-3'

(Primer 2)
                                        (SEQ ID NO: 2)
5'-CAGAGTAGTGACAAGTGTTGGCCATGG-3'

(Primer 3)
                                        (SEQ ID NO: 3)
5'-TTTCCCCGCCGCCCCCTTATTATTATTTGTAGAGCTCATCCATGC-
3'

(Primer 4)
                                        (SEQ ID NO: 4)
5'-GGCCAACACTTGTCACTACTCTGNNNTATGGTGTTCAATGCTTTTCC
CG-3'
```

Figure 3:
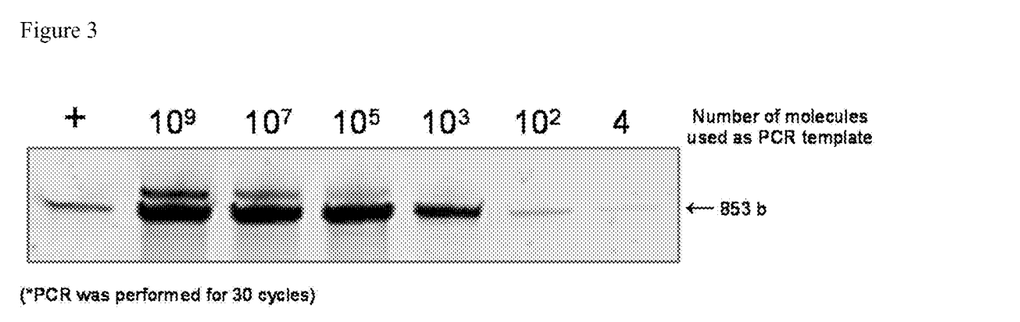
FIG. 3 shows the results of electrophoresis of a PCR product obtained by diluting a GFP cDNA library and then performing PCR using it as a template.

2. Dilution to Result in Concentration of Single Molecule DNA and Single-Molecule PCR A fragment (853 bp) amplified by PCR was purified using the DNA purification kit of QIAGEN, resulting in a concentration of 7.04 nM. This cDNA was diluted with nuclease-free purified water to have concentrations of $4\times10^8$, $4\times10^7$, $4\times10^6$, $4\times10^5$, $4\times10^4$, $4\times10^3$, $4\times10^2$, 40, 4, and 0.4 molecules per µl. Using these as templates, a PCR reaction was carried out in a 1× ExTaq PCR buffer (Takara), with dNTP of a final concentration of 0.2 mM, a 2-µM forward primer (5'-Cy3GATCCCGCGAAATTAATACGACTCACTATAGGG-3' (SEQ ID NO: 5); the 5'-terminus labeled with Cy3), and a reverse primer (5'-BiotinTTTCCCCGCCGCCCCCTTAT-TATTATTTGTAGAGC (SEQ ID NO: 6); the 5'-terminus labeled with biotin), also using 0.5 U ExTaq DNA polymerase (Takara). The PCR reaction conditions consisted of 50 cycles of 95° C. for 2 minutes and (94° C. (30 seconds), 64° C. (30 seconds) and 72° C. (60 seconds)), and finally an elongation reaction at 72° C. for 10 minutes. 2 µl of aliquot was obtained from the obtained reaction product, and it was then analyzed by 8 M urea denatured polyacrylamide gel electrophoresis (FIG. 3).

3. Immobilization of PCR Product on Chip

Figure 4:
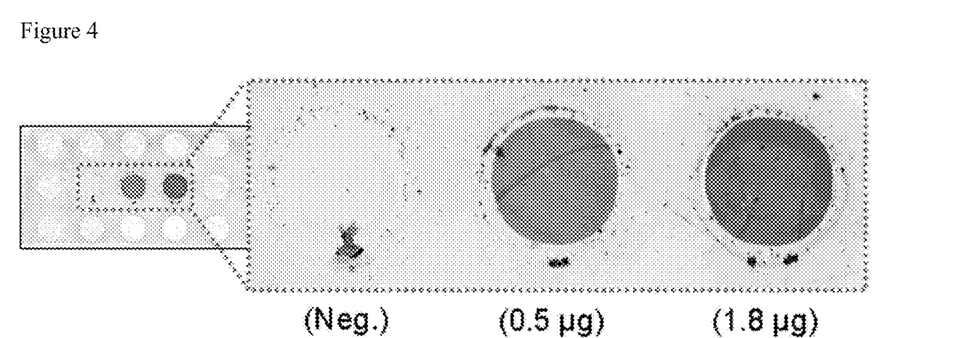
FIG. 4 shows the results obtained by confirming a single molecule of PCR product immobilized on a chip by a method of detecting the fluorescence of Cy3. Neg.: a negative control containing no DNA.

The amplified single-molecule PCR product was purified with the purification column of QIAGEN, and the concentration thereof was then measured with Nanodrop. The PCR solution containing biotinylated DNA was mixed with an equal volume of 2× binding buffer (20 mM Tris-HCl (pH 8.0), 2 mM EDTA, 2 M NaCl, and 0.2% TritonX-100), and the obtained mixture was then added to a 384-well microplate. Subsequently, a 10-µl-scale reaction product was transferred onto a streptavidin-coated slide glass (ArrayIt), and it was then incubated for 15 minutes. Thereafter, the surface of the glass was washed with 1× binding buffer. The amplified DNA emitted the fluorescence of Cy3. Thus, the slide glass was examined using a fluoroimager (Typhoon) (FIG. 4).

4. Transcription on Chip

Figure 5:
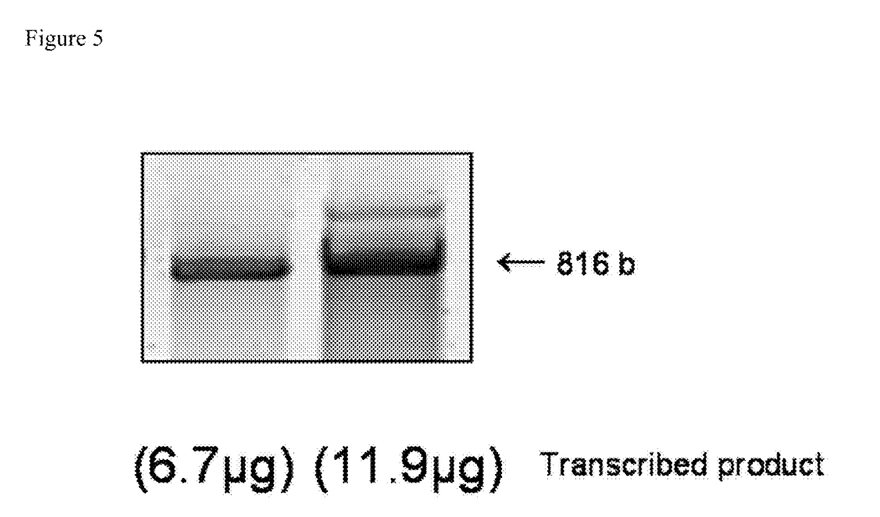
FIG. 5 shows the results obtained by allowing a chip on which a PCR product is immobilized to come into contact with a microplate filled with T7 transcriptase and a reaction solution thereof so as to carry out a transcription reaction, and then by confirming RNA existing in each well on the microplate via electrophoresis.

The cDNA on the aforementioned slide glass was further superposed on a 384-well microplate filled with T7 reverse transcriptase and 20 µl of the reaction solution (RiboMAX; Promega), so that they were reacted at 37° C. for 3 hours. Thereafter, the DNA template was decomposed by DNase, the reaction solution was then collected from each well, and it was then purified using RNA RNeasy Kit (QIAGEN). It was analyzed by 8 M urea denatured polyacrylamide gel electrophoresis (FIG. 5).

5. Measurement of Biomolecular Activity in Microreactor

Figure 6:
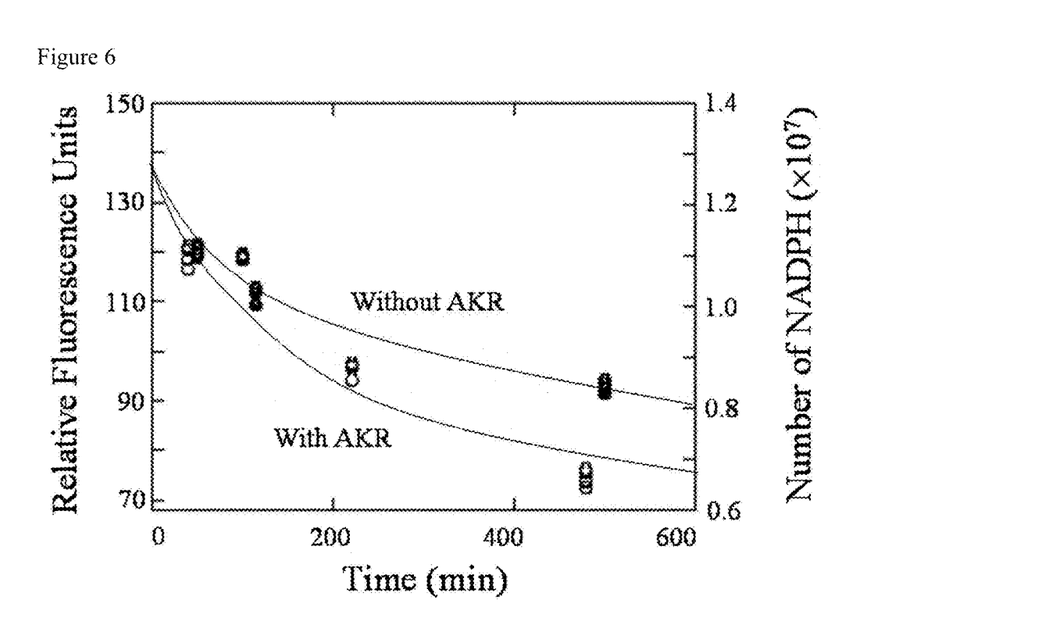
FIG. 6 shows the measurement results of enzyme reactions (aldehyde-degrading enzyme) in microreactors.

In order to measure the activity of biomolecules immobilized on a chip produced by the present invention, the activity of a model protein was measured. As a measurement model system, aldehyde reductase (AKR) was used. A trace enzyme reaction was measured on a microreactor array chip comprising 10,000 microreactors with a diameter of 6 µm and a height of 6 µm (0.15 µl) produced from PDMS (Polydimethylsiloxane) produced by the aforementioned method. That is, 2 µM (10,000/reactor) enzyme AKR, 20 mM glucuronate as a substrate, and 0.2 mM NADPH as a coenzyme were enclosed in a reactor. For an aldehyde reductase reaction (aldehyde+NADPH→alcohol+NADP+), using the i ray (365 nm) of a mercury lamp as an excitation light, the self-fluorescence intensity of NADPH with a wavelength of 400 nm or greater was detected using a high-sensitive cold CCD camera. Based on a change in the fluorescence intensity of NADPH, the progression of the aldehyde reductase reaction was measured. From the measurement results (FIG. 6), the enzyme activity was calculated to be 1-10 (NADPH oxidized/min/AKR). Thus, it became clear that the activity of enzyme contained in each microreactor can be evaluated by optical measurement. In addition, such enzyme reaction can be evaluated not only by such optical measurement but also by electrochemical measurement. It is also possible to realize parallel measurement by accumulating microelectrodes in such a microreactor.

INDUSTRIAL APPLICABILITY

The chip of the present invention is useful for the high throughput processing of an assay for pharmaceutical candidate molecules in the development of pharmaceutical products. In addition, the present chip can also be used as a diagnostic chip in the field of diagnostic agents, diagnostic apparatuses, and the like. Moreover, it can also be used in the analyses of metabolizing systems such as bioethanol synthase. Furthermore, the method of the present invention for producing the aforementioned chip can contribute as an evolutional engineering method to the discovery of functional molecules useful for environmental and energetic fields in the future.

The invention claimed is:

1. A method for producing a chip on which biomolecules are immobilized in an aligned state, which comprises the following steps (a) to (e):
(a) producing a substrate 1 on which a plurality of biomolecules 1 of a single type are immobilized in an aligned state;
wherein said biomolecules 1 are cDNA;
(b) filling microreactors on a microreactor chip comprising the microreactors at positions overlapping with the sequence positions of the cDNA biomolecules 1 immobilized on the substrate 1 produced in the step (a), with reaction reagents for synthesizing biomolecules 2;
wherein said biomolecules 2 are mRNA;
(c) closely attaching the microreactor chip to the substrate 1 so that the reaction reagents for synthesizing the mRNA biomolecules 2 are allowed to come into contact with the cDNA biomolecules 1, and then carrying out a reaction of synthesizing the mRNA biomolecules 2 in the microreactors so as to synthesize the mRNA biomolecules 2 in reaction solutions contained in the microreactors;
(d) superposing the microreactor chip on a substrate 2 so that the reaction solutions contained in the microreactors on the microreactor chip are allowed to come into contact with the substrate 2 after completion of the step (c), so as to immobilize the mRNA biomolecules 2 on the substrate 2;
wherein linker DNA is bound to said mRNA biomolecules 2 and a compound that specifically binds to a protein is bound to said linker DNA; and
(e) immersing the substrate 2 in reaction reagents for synthesizing biomolecules 3 from the mRNA biomolecules 2 immobilized on the substrate 2;
wherein said biomolecules 3 are protein-nucleic acid complexes in which said protein is bound to said compound.

2. The method of claim 1, wherein step (a) comprises: diluting mixed solutions of cDNA biomolecules 1 and reaction reagents for amplifying the biomolecules, and then filling microreactors on a microreactor chip with the diluted solutions, so that a single molecule or less of the cDNA biomolecules 1 can be present therein in a probability distribution manner; and carrying out a reaction of amplifying the cDNA biomolecules 1.

3. The method according to claim 2, wherein the reaction of amplifying the cDNA biomolecules 1 is a polymerase chain reaction.

4. The method according to claim 2, comprising immobilizing avidin on the substrate 1, biotinylating the cDNA biomolecules 1 and thereby binding said cDNA biomolecules 1 to said substrate 1 via an avidin-biotin bond.

5. The method according to claim 1, the reaction reagents are a solution containing a cell-free translation system and a solution containing a transcriptase.

6. The method according to claim 1 wherein the cDNA biomolecules 1 are immobilized in wells formed on the substrate 1 in an aligned state.

7. The method of claim 1 wherein said cDNA biomolecules 1 are immobilized as an array on said substrate 1 in said aligned state, said cDNA biomolecules 1 having different sequences than each other, each of said protein-nucleic acid complex biomolecules 3 are immobilized on said substrate 2 in a position corresponding to a position of the cDNA biomolecule 1 in said array that encodes said protein-nucleic acid complex biomolecule 3.

8. The method of claim 1 wherein from said substrate 1 on which said cDNA biomolecules 1 are immobilized in an aligned state is prepared a substrate on which said protein-nucleic acid complex biomolecules 3 encoded by the individual cDNAs are immobilized in positions corresponding to the positions of the immobilized cDNAs, without changing the corresponding positions of protein-nucleic acid complex biomolecules 3 on said substrates.

9. The method of claim 1 comprising performing a reverse transcription reaction of the mRNA of said protein-nucleic acid complex biomolecules 3 to DNA by immersing the substrate 2 on which said protein-nucleic acid complex biomolecules 3 are immobilized in reaction solutions that contain reverse transcriptase.

10. The method of claim 1 wherein said compound is puromycin.

* * * * *

UNITED STATES PATENT AND TRADEMARK OFFICE
CERTIFICATE OF CORRECTION

PATENT NO. : 8,592,348 B2  Page 1 of 1
APPLICATION NO. : 12/447803
DATED : November 26, 2013
INVENTOR(S) : Nemoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1103 days.

Signed and Sealed this
Twenty-second Day of September, 2015

Michelle K. Lee
*Director of the United States Patent and Trademark Office*

SEQUENCE LISTING

```
<160> NUMBER OF SEQ ID NOS: 6

<210> SEQ ID NO 1
<211> LENGTH: 33
<212> TYPE: DNA
<213> ORGANISM: Artificial
<220> FEATURE:
<223> OTHER INFORMATION: designed nucleotides

<400> SEQUENCE: 1
gatcccgcga aattaatacg actcactata ggg                              33

<210> SEQ ID NO 2
<211> LENGTH: 27
<212> TYPE: DNA
<213> ORGANISM: Artificial
<220> FEATURE:
<223> OTHER INFORMATION: designed nucleotides
```

-continued

```
<400> SEQUENCE: 2
cagagtagtg acaagtgttg gccatgg                                                27

<210> SEQ ID NO 3
<211> LENGTH: 45
<212> TYPE: DNA
<213> ORGANISM: Artificial
<220> FEATURE:
<223> OTHER INFORMATION: designed nucleotides

<400> SEQUENCE: 3
tttccccgcc gccccttat tattatttgt agagctcatc catgc                             45

<210> SEQ ID NO 4
<211> LENGTH: 49
<212> TYPE: DNA
<213> ORGANISM: Artificial
<220> FEATURE:
<223> OTHER INFORMATION: designed nucleotides
<220> FEATURE:
<221> NAME/KEY: misc_feature
<222> LOCATION: (24)..(26)
<223> OTHER INFORMATION: n is a, t, g or c.

<400> SEQUENCE: 4
ggccaacact tgtcactact ctgnnntatg gtgttcaatg cttttcccg                        49

<210> SEQ ID NO 5
<211> LENGTH: 33
<212> TYPE: DNA
<213> ORGANISM: Artificial
<220> FEATURE:
<223> OTHER INFORMATION: designed nucleotides

<400> SEQUENCE: 5
gatcccgcga aattaatacg actcactata ggg                                         33

<210> SEQ ID NO 6
<211> LENGTH: 35
<212> TYPE: DNA
<213> ORGANISM: Artificial
<220> FEATURE:
<223> OTHER INFORMATION: designed nucleotides

<400> SEQUENCE: 6
tttccccgcc gccccttat tattatttgt agagc                                        35
```